No. 797,647. PATENTED AUG. 22, 1905.
D. O. WARD.
COMPOSITE BRAKE SHOE.
APPLICATION FILED FEB. 26, 1904.
8 SHEETS—SHEET 1.
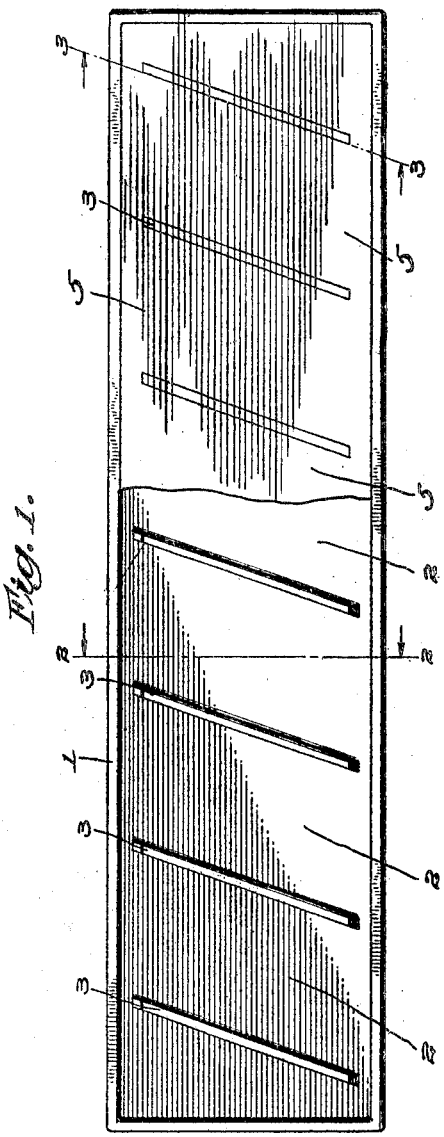
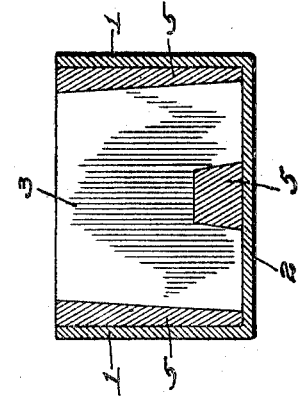
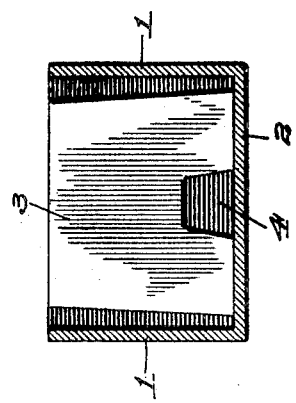

No. 797,647. PATENTED AUG. 22, 1905.
D. O. WARD.
COMPOSITE BRAKE SHOE.
APPLICATION FILED FEB. 26, 1904.
8 SHEETS—SHEET 2.
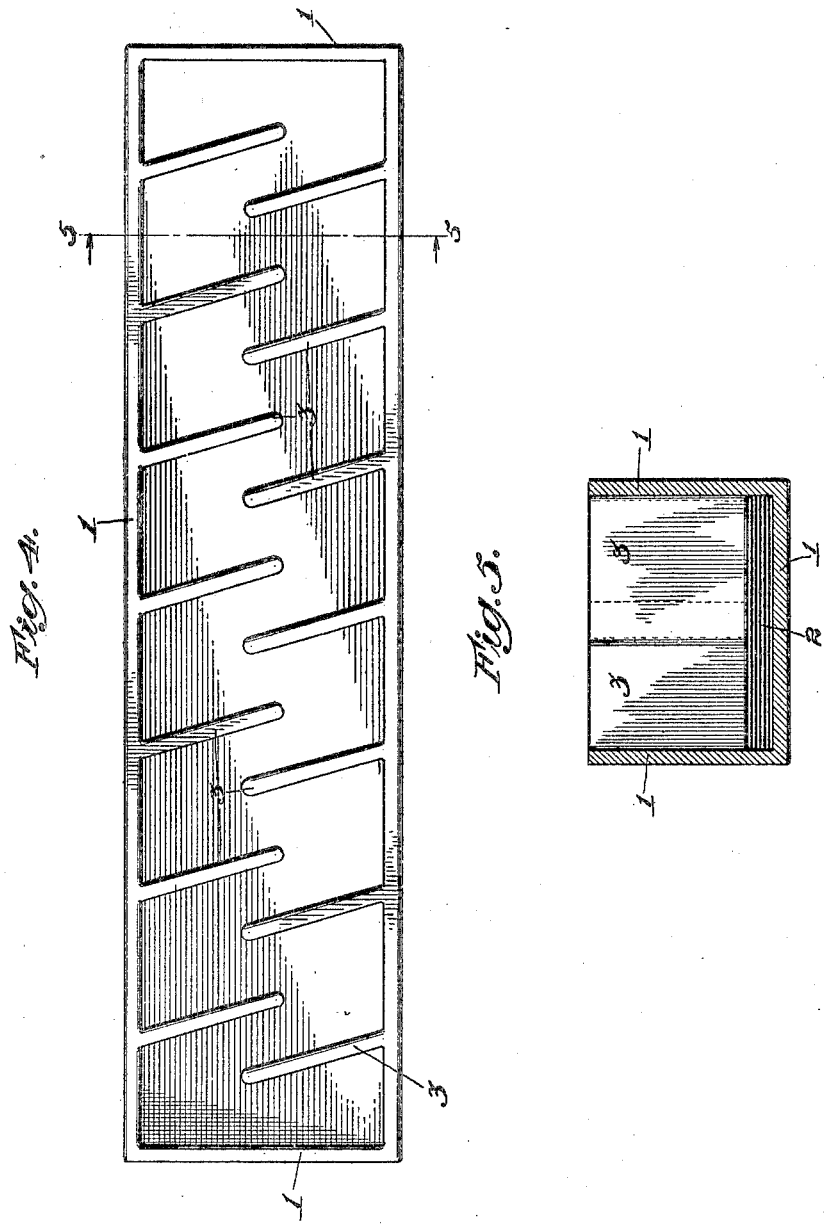

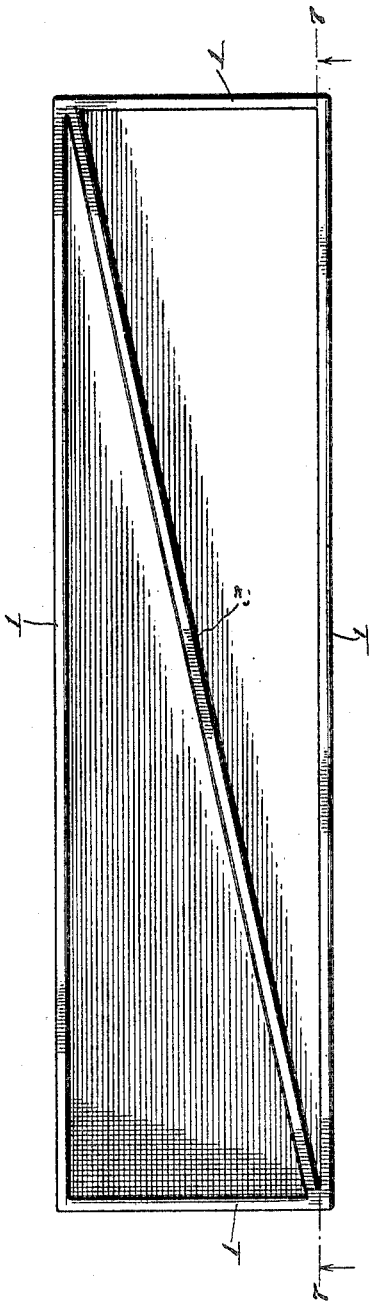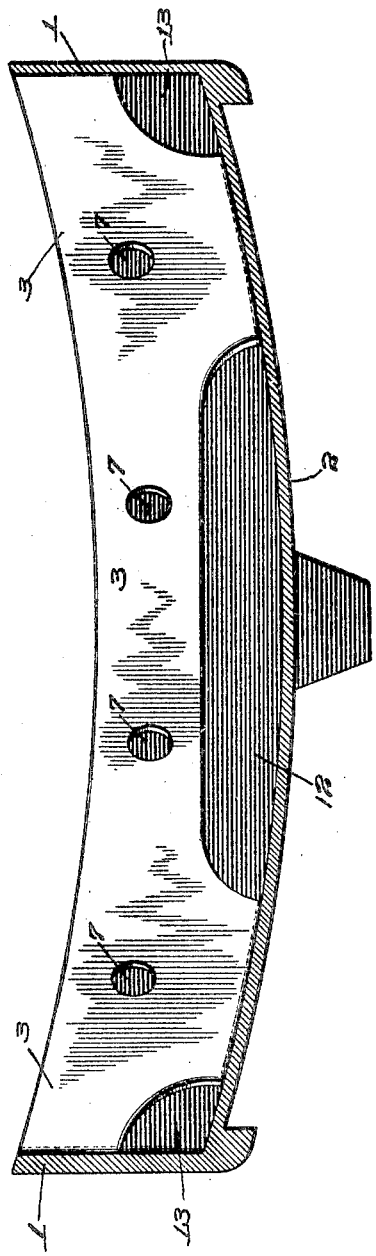

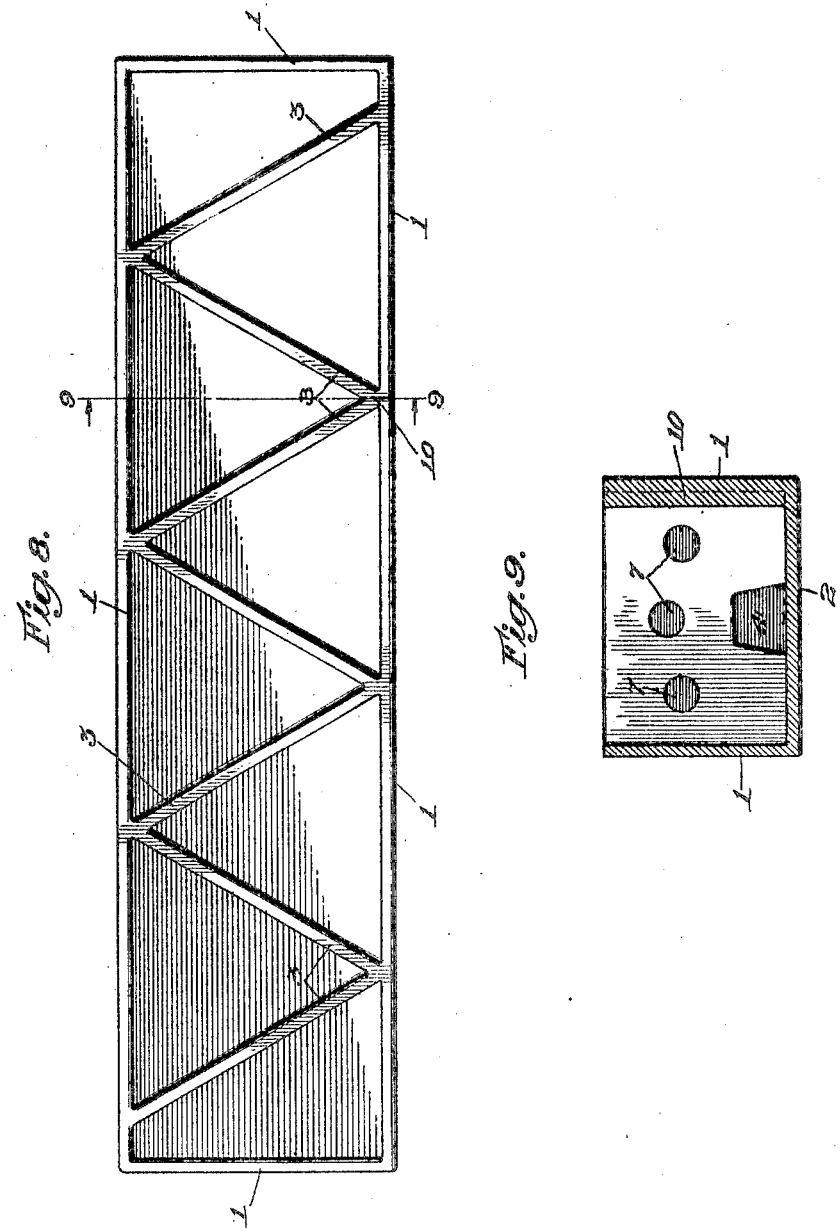

No. 797,647. PATENTED AUG. 22, 1905.
D. O. WARD.
COMPOSITE BRAKE SHOE.
APPLICATION FILED FEB. 26, 1904.
8 SHEETS—SHEET 5.
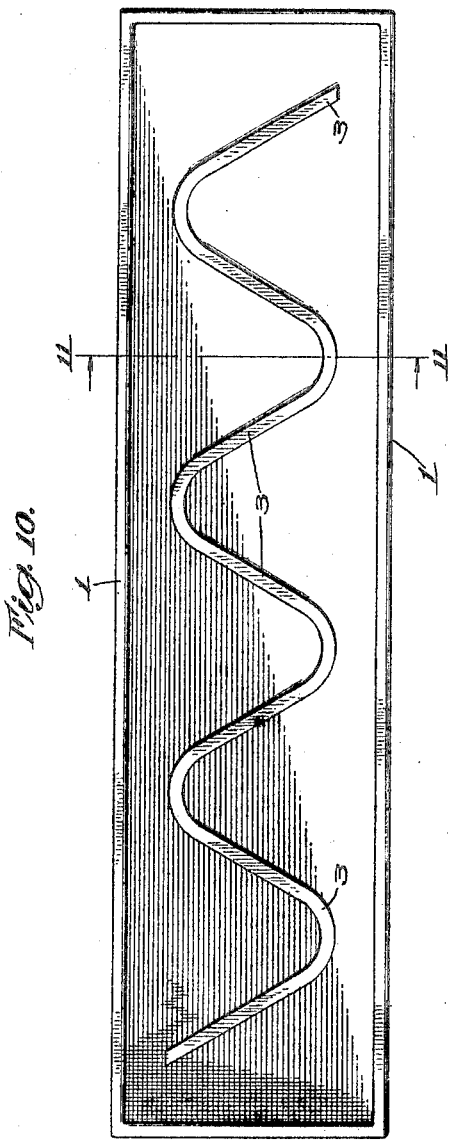
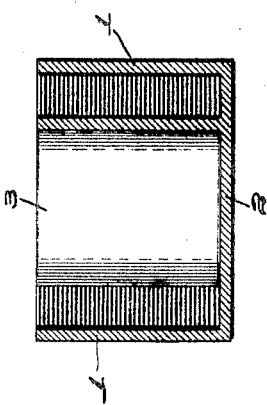
Witnesses:
Robert H. Weir
Emil Wettmann
Inventor.
Daniel O. Ward
By John W. Hill
Atty.

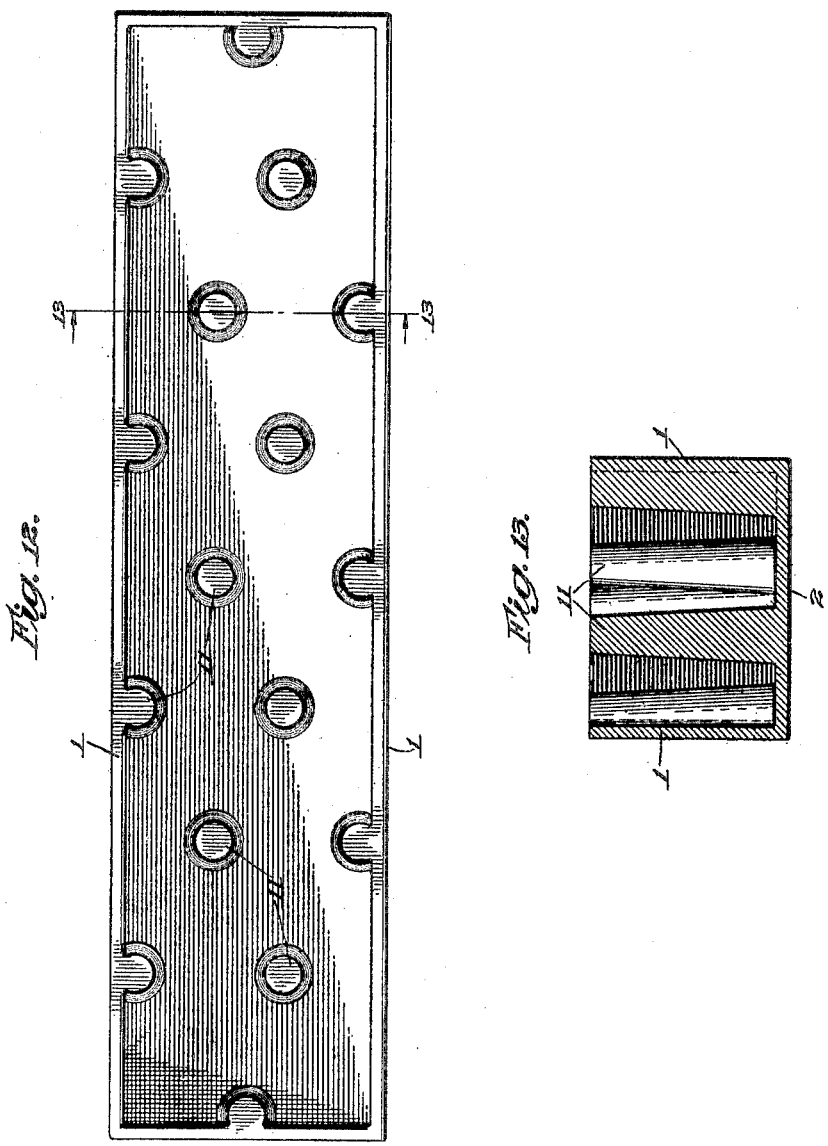

No. 797,647. PATENTED AUG. 22, 1905.
D. O. WARD.
COMPOSITE BRAKE SHOE.
APPLICATION FILED FEB. 26, 1904.
8 SHEETS—SHEET 7.
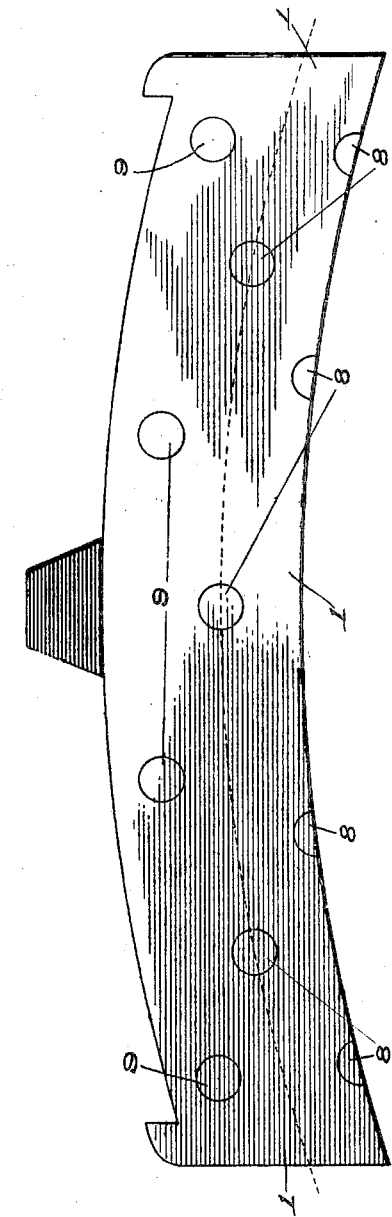
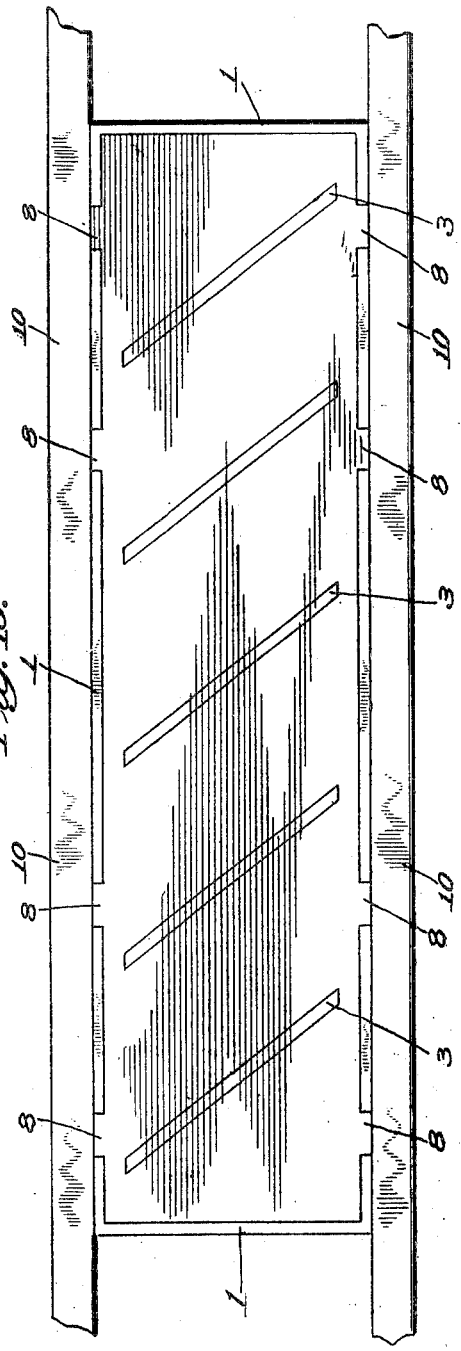

No. 797,647. PATENTED AUG. 22, 1905.
D. O. WARD.
COMPOSITE BRAKE SHOE.
APPLICATION FILED FEB. 26, 1904.
8 SHEETS—SHEET 8.
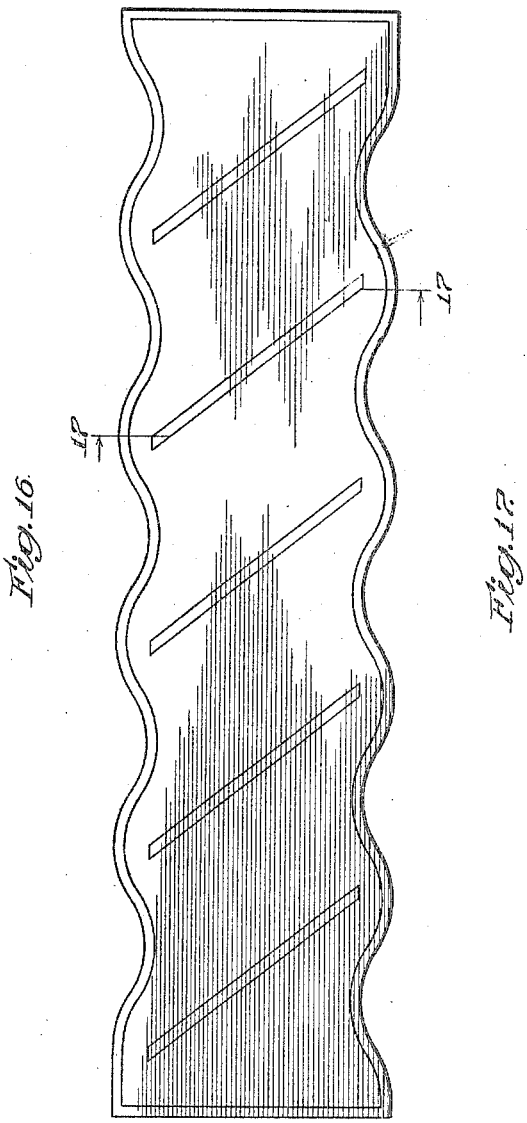
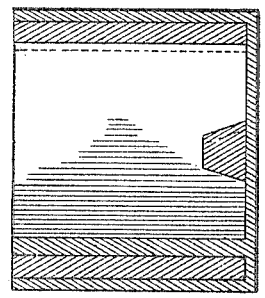
Witnesses:
Robert H. Weir
J. B. Weir
Inventor
Daniel O. Ward
By John W. Hill
Atty.

UNITED STATES PATENT OFFICE.

DANIEL O. WARD, OF OAK PARK, ILLINOIS.

COMPOSITE BRAKE-SHOE.

No. 797,647.  Specification of Letters Patent.  Patented Aug. 22, 1905.

Application filed February 26, 1904. Serial No. 195,327.

*To all whom it may concern:*

Be it known that I, DANIEL O. WARD, a citizen of the United States, residing at Oak Park, in the county of Cook and State of Illinois, have invented certain new and useful Improvements in Composite Brake-Shoes, of which the following is a description.

This invention relates to that class of brake-shoes which are composed of two or more different metals which are exposed at the face of the shoe as the shoe is worn away in service.

The object of this invention is to produce a brake-shoe of this class which consists of a metal box or shell which will not break readily and which forms a supporting means for wings, plates, partitions, or projections, which extend through the body of the shoe, thereby providing a composite wearing-face, as will be hereinafter described.

A further object is to overcome some of the difficulties encountered in the use of brake-shoes.

In the brake-shoes now in general use the material used is a hard grade of cast-iron, the object being to prolong the wearing life of the shoe by increasing the hardness of the iron. Such iron is quite brittle, and consequently these shoes are frequently broken, and usually when upon cars in trains in motion on the road. As the shoe in use is suspended directly above the rail, any fragments caused by such breakage may cause a serious disaster by lodging in the frogs or switches or upon the rail and derailing the following trucks. Another loss on large railroad systems is that these fragments are rarely recovered, and they amount to a large item in the course of a year. With my shoe the box is made of some strong and tough though soft material, whose very softness unfits it when used alone for a brake-shoe or whose price would make a solid shoe inexpedient—for example, annealed cast-steel, malleable iron, or pressed steel, and filled with a cast metal surrounding the insert portions. The sides of the shell and the inserts will tend to increase the hardness of the adjacent metal body by chilling the same upon their surfaces, giving the great strength and elasticity of the box and inserts to hold the shoe intact to the brake-head, combined with the extreme hardness of the chilled cast-metal body, and so arranged that if when partly worn out the body portion should break it would not escape from its position in the shell even when the shoe was so worn as to be bent by uneven pressure against the wheels.

In the following specification where the word "insert" is used I wish it to be understood as any projecting part which lies within the space inclosed by the sides of the shell or box and adapted to be embedded in the filling-body when the shoe is complete.

In the accompanying drawings, wherein like reference characters indicate like or corresponding parts, Figure 1 represents the face of one of the preferred forms of my brake-shoe, in which the filling-body is shown removed from one end, leaving only the inserts within the shell in that end. Fig. 2 represents a section taken on line 2 2 of Fig. 1. Fig. 3 represents a section taken on line 3 3 of Fig. 1. Fig. 4 represents the face of a brake-shoe, showing a modified form of inserts. Fig. 5 represents a section on line 5 5 of Fig. 4. Fig. 6 represents the face of a brake-shoe, showing a single diagonal insert. Fig. 7 represents a section taken on line 7 7 of Fig. 6. Fig. 8 represents the face of a brake-shoe, showing a sinuously-curved insert attached to both sides of the shell. Fig. 9 represents a section taken on line 9 9 of Fig. 8. Fig. 10 represents the face of a brake-shoe, showing a single sinuously-curved insert not attached to the sides of the shell. Fig. 11 represents a section taken on line 11 11 of Fig. 10. Fig. 12 represents the face of a brake-shoe, in which the inserts are shown in the shape of fingers projecting from the bottom of the shell. Fig. 13 represents a section taken on line 13 13 of Fig. 12. Fig. 14 represents a side elevation showing openings through the sides of the shell, and Fig. 15 represents the face of a brake-shoe with plates or bars against its sides to stop the filling metal flush with the outside of the shell when filling. Fig. 16 represents the face of a brake-shoe with sinuously-curved sides. Fig. 17 represents a section taken on line 17 17 of Fig. 16.

The preferred form of my brake-shoe consists of a malleable-iron or soft-steel box cast with integral inserts, as shown in Figs. 1, 2, and 3, in which 1 2 is the box or shell, which externally may be in the usual or any suitable form. Cast integral with the back 2 of this shell are a plurality of inwardly-extending plates or inserts 3. In the figure referred to these plates are shown not connected to the sides 1 of the box 1 2 nor at right angles to the sides 1. It is obvious, however, that any or all of these inserts may be connected to the sides 1 at either or both sides of the shell or be at right angles or at any angle thereto without departing from the spirit of my invention. Preferably each plate 3 has formed therein an opening or an equivalent near the junction of the plate with the back of the shell, the sides of this opening diverging as they approach the back of the shell, as shown.

The body of the shoe is formed by pouring molten metal into this shell, which fills the spaces between the inserts 3, as well as the openings 4, which form a convenient channel to aid in the distribution of the metal the entire length of the shell and forms a lock which effectually prevents the body metal from becoming detached from the shell. Owing to the aforesaid shape of this opening, it will continue to securely unite the body and shell as the shoe is worn down. These inserts and the shell are preferably made of softer material than the body 5. If this softer material adheres to the face of the wheel, it will be scraped off by the intervening portions of harder material, and thus any "blistering" of the wheels is obviated.

A shoe made as above described will possess all the advantages of a shoe with steel inserts embedded therein, with the further advantage of great strength and cheapness of manufacture. The plates may be arranged in any preferred manner. Their points of juncture with the shell may also be modified without departing from the spirit of my invention. For example, as shown in Fig. 4, the inserts 3 may be united alternately with opposite sides 1 1 of the shell, or any or all may extend entirely across the shell and attach to both sides. They may also be united with the back of the shell, but not necessarily so, as a space may be left between said plates and back of shell, as shown in Fig. 5. This space can be made sufficiently large to permit the covering of the entire back of the shell by the filling metal, and in this case no other locking device would be required, as the inserts would effectually hold the body metal in place until they were entirely worn away. Openings of any desired size, form, and arrangement may be provided in these plates 3 to further strengthen the bond between the inserts and the body or filling. In this case the inserts may extend nearly to the wall of the shell opposite that to which they are joined instead of, as shown in Fig. 4, where the plates 3 extend but slightly more than half-way across the shoe. A single plate may be employed, as shown in Fig. 6. Such a plate 3 may extend diagonally across the box, being united thereto at its ends. This plate may be provided with openings, as shown at 7, 12, and 13, of any desired form, size, and arrangement for the purposes heretofore stated.

A single plate may be formed in a sinuous curve, as shown in Fig. 8, which may be united at intervals, as shown at 10, and at its ends with a box 1. This plate may be provided with openings, as shown at 4, also with others, (shown at 7,) which are so arranged that the body or filling material which fills these openings 7 will as the shoe is worn away and these openings worn into cause the thus-exposed surfaces to gradually shift transversely on the shoe, and thus obviate any tendency of the shoe to groove the wheel-face. Fig. 10 shows an insert formed with a sinuously-curved plate 3, which is not attached to the sides or ends of the shell, its points of junction being entirely on the back of the shell. This plate may be provided with openings of any size, form, and arrangement for the purpose already stated. The plurality of plates (shown in Fig. 1) may be modified and formed in projections of any shape—for example, the finger-like projections shown at 11, Fig. 12. These may be integral with the back of the shell and may be tapering, as shown in Fig. 13, for facilitating casting. The inserts (shown in Fig. 4) may be modified in the same manner—that is, formed in projections or fingers attached to the sides of the shell only, or these fingers may be extended entirely across from side to side of the shell. In the drawings these projections are shown as circular in section; but it is obvious that rectangular, oval, triangular, or any other section may be employed and not depart from the spirit of my invention.

To prevent the metal which forms the sides of the shell from injuring the tread of the wheel, these sides may be sinuously curved, as shown in Figs. 16 and 17, or the sides may be provided with openings 8. (Shown in Fig. 14.) When the filling metal is poured into the shell, it will enter these openings, forming projections extending substantially across the sides of the shell and which will be of a different degree of hardness from the shell. With this arrangement any of the softer material adhering to the face of the wheel when the brakes are applied will be scraped off upon coming in contact with the harder material in line therewith. These projections also assist in securing the filling metal within the shell. For this purpose other openings, as shown at 9, Fig. 14, may be placed close to the back of the shell, and thereby lock the filling-body to the shell until both are worn away almost to the back of the shell. It is evident that any of the shells illustrated in the accompanying drawings may be provided with openings, as shown at 8 or 9, for the purposes above explained. Before the filling-body is introduced into the shell bars or plates 10, Fig. 15, may be placed against the outer sides of the box. The material would then fill the openings and be stopped at the plate or bar 10, so that the exterior of the shoe would be smooth without any chipping or grinding of its surface.

Having thus described my improvement, it is obvious that various immaterial modifications may be made without departing from the spirit of my invention. Hence I do not wish to be understood as limiting myself to the exact form and construction shown.

Having thus described my invention, what I claim as new, and desire to secure by Letters Patent, is—

1. A brake-shoe, comprising a cast-metal shell formed with corrugated sides, provided with one or more inserts arranged therein and cast integral therewith, in combination with a metal body cast within the shell about the inserts.

2. A brake-shoe, comprising a cast-metal shell of suitable form provided with a plurality of inserts arranged therein, extending inward from either side thereof and cast integral with the shell, in combination with a metal body cast within the shell about the inserts.

3. A brake-shoe, comprising a cast-metal shell of suitable form provided with one or more sheet or plate inserts arranged therein, said inserts being formed integral with the sides of said shell but spaced from its back, in combination with a metal body cast within the shell about the inserts.

4. A brake-shoe, comprising a shell of suitable form provided with one or more sheet or plate inserts arranged therein, formed integral therewith, and provided with an opening near their junction with the back of said shell, in combination with a metal body cast within the shell about the inserts.

5. A brake-shoe, comprising a cast-metal shell with corrugated sides, provided with one or more inserts arranged therein, cast integral with the shell and provided with an opening near their junction with the back of said shell, in combination with a metal body cast within the shell about the inserts.

6. A brake-shoe, comprising a shell of suitable form provided with a plurality of inserts arranged therein, and formed integral therewith one or more of said inserts having an opening near their junction with the back of said shell, in combination with a metal body cast within the shell about the inserts.

7. A brake-shoe, comprising a shell of suitable form, having openings in its sides and an insert arranged within the shell, and formed integral therewith, in combination with a metal body cast about the insert within the shell, and entering the said openings.

8. A brake-shoe, comprising a shell of suitable form, having openings in its sides, and a plurality of inserts arranged within the shell, and formed integral therewith, in combination with a metal body cast about the inserts, within the shell and entering the said openings.

9. A brake-shoe, comprising a shell of suitable form, having openings in its sides, and a sheet or plate insert arranged within the shell, and formed integral therewith, in combination with a metal body cast about the insert, within the shell and entering the said openings.

10. A brake-shoe, comprising a shell, of suitable form, having openings in its sides and a plurality of sheet or plate inserts arranged within the shell, and formed integral therewith, in combination with a metal body, cast about the inserts, within the shell, and entering the said openings.

11. A brake-shoe, comprising a shell of suitable form, and a sheet or plate insert provided with openings, arranged within the shell, and formed integral therewith, in combination with a metal body cast within the shell, about the insert, and entering the said openings.

12. A brake-shoe, comprising a shell of suitable form, and a plurality of sheet, or plate inserts provided with openings arranged within the shell, and formed integral therewith, in combination with a metal body, cast within the shell about the inserts and entering said openings.

13. A brake-shoe, comprising a shell of suitable form, with openings in its sides and a sheet or plate insert, provided with openings, arranged within the shell, and formed integral therewith, in combination with a metal body, cast about the inserts within the shell, and entering the opening in the insert and those in the shell.

14. A brake-shoe, comprising a shell of suitable form, with openings in its sides, and a plurality of sheet or plate inserts, provided with openings, arranged within the shell, and formed integral therewith, in combination with a metal body cast about the inserts within the shell, and entering the openings in both inserts and shell.

15. A brake-shoe, comprising a shell of suitable form, and a sheet or plate insert arranged therein, formed integral therewith, and provided with an opening near the junction with the back of the shell, said opening being wider next the back of the shell than on its opposite side, in combination with a metal body cast within the shell about the insert and entering said opening.

16. A brake-shoe, comprising a shell of suitable form, and a plurality of sheet or plate inserts arranged therein and formed integral therewith, each provided with an opening near its junction with the back of the shell, said opening being wider next the back of the shell than on its opposite side, in combination with a metal body cast within the shell about the inserts and entering said openings.

17. A brake-shoe, comprising a shell of suitable form, with openings in its sides and a sheet or plate insert arranged therein, and formed integral therewith, provided with an opening near its junction with the back of the shell, said opening being wider next the back of the shell than on its opposite side, in combination with a metal body cast about the insert within the shell and entering the opening in the insert and those in the shell.

18. A brake-shoe, comprising a shell of suitable form, with openings in its sides, and a plurality of sheet or plate inserts arranged therein, and formed integral therewith each provided with an opening near its junction with the back of the shell, said opening being wider next the back of the shell than on its opposite side, in combination with a metal body cast about the insert entering the opening in the insert and those in the shell.

19. A cast-metal brake-shoe shell formed with corrugated sides, provided with one or more inserts arranged therein and cast integral therewith.

20. A cast-metal brake-shoe shell of suitable form provided with a plurality of inserts arranged therein, extending inward from either side thereof and cast integral with the shell.

21. A cast-metal brake-shoe shell of suitable form provided with one or more sheet or plate inserts arranged therein, said inserts being formed integral with the sides of said shell but spaced from its back.

22. A brake-shoe shell of suitable form provided with a plurality of inserts arranged therein, and formed integral with the shell, one or more of said inserts having an opening near their junction with the back of said shell.

23. A brake-shoe shell, of suitable form, having openings in its sides with an insert arranged within the shell, and formed integral therewith.

24. A brake-shoe shell, of suitable form, having openings in its sides with a plurality of inserts arranged within the shell, and formed integral therewith.

25. A brake-shoe shell, of suitable form, having openings in its sides, with a sheet or plate insert arranged within the shell, and formed integral therewith.

26. A brake-shoe shell, of suitable form, having openings in its sides with a plurality of sheet or plate inserts arranged within the shell, and formed integral therewith.

27. A brake-shoe shell of suitable form, having a sheet or plate insert provided with openings, arranged therein, and formed integral therewith.

28. A brake-shoe shell, of suitable form, having a plurality of sheet or plate inserts provided with openings, arranged within the shell, and formed integral therewith.

29. A brake-shoe shell, of suitable form, having openings in its sides, with a sheet or plate insert provided with openings, arranged within the shell, and formed integral therewith.

30. A brake-shoe shell, of suitable form, having openings in its sides, with a plurality of sheet or plate inserts provided with openings, arranged within the shell, and formed integral therewith.

31. A brake-shoe shell, of suitable form, having a sheet or plate insert arranged therein, and formed integral therewith, and provided with an opening near its junction with the back of the shell, said opening being wider next the back of the shell than on the opposite side.

32. A brake-shoe shell, of suitable form, having a plurality of sheet or plate inserts arranged therein, and formed integral therewith, each provided with an opening near its junction with the back of the shell, said opening being wider next the back of the shell than on its opposite side.

33. A brake-shoe shell, of suitable form, having openings in its sides, and a sheet or plate insert arranged within the shell, and formed integral therewith, and provided with an opening near its junction with the back of the shell, said opening being wider next the back of the shell than on its opposite side.

34. A brake-shoe shell, of suitable form having openings in its sides, and a plurality of sheet or plate inserts arranged within the shell, and formed integral therewith each provided with an opening near its junction with the back of the shell, said opening being wider next the back of the shell than on its opposite side.

In testimony whereof I have hereunto signed my name in the presence of two subscribing witnesses.

DANIEL O. WARD.

Witnesses:
 BURTON U. HILLS,
 CHARLES I. COBB.